No. 798,797. PATENTED SEPT. 5, 1905.
J. A. JOHNSON.
MOLD FOR FORMING CONCRETE RECEPTACLES.
APPLICATION FILED AUG. 30, 1904.

2 SHEETS—SHEET 1.

Witnesses:
F. W. Woerner
L. B. Woerner

Inventor,
John A. Johnson,
By Jos. A. Minturn
Attorney.

No. 798,797. PATENTED SEPT. 5, 1905.
J. A. JOHNSON.
MOLD FOR FORMING CONCRETE RECEPTACLES.
APPLICATION FILED AUG. 30, 1904.

Witnesses
F. H. Hoerner
L. B. Hoerner

Inventor
John A. Johnson,
By Jos. A. Minturn
Attorney

UNITED STATES PATENT OFFICE.

JOHN A. JOHNSON, OF GREENFIELD, INDIANA.

MOLD FOR FORMING CONCRETE RECEPTACLES.

No. 798,797. Specification of Letters Patent. Patented Sept. 5, 1905.

Application filed August 30, 1904. Serial No. 222,743.

*To all whom it may concern:*

Be it known that I, JOHN A. JOHNSON, a citizen of the United States, residing at Greenfield, in the county of Hancock and State of Indiana, have invented certain new and useful Improvements in Molds for Forming Concrete Receptacles, of which the following is a specification.

This invention relates to improvements in molds for forming burial-vaults, water-troughs, milk-troughs, and other similar receptacles out of cement and sand; and the object is to provide a mold that can be adjusted in length and width to make receptacles of different dimensions.

The object also is to provide a mold that can be assembled by few assistants and removed after the receptacle is formed without danger of breaking or marring the green cement, and the object is to construct the mold so as to produce a smoothly-finished product.

I accomplish these objects by the mechanism illustrated in the accompanying drawings, in which—

Figure 1:
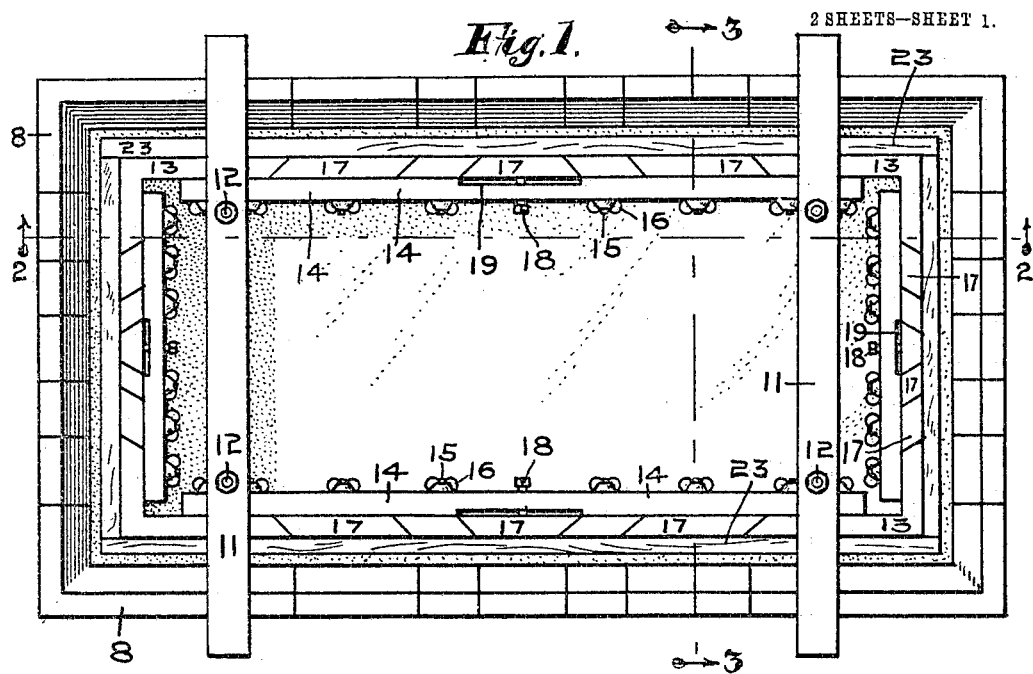
Figure 2:
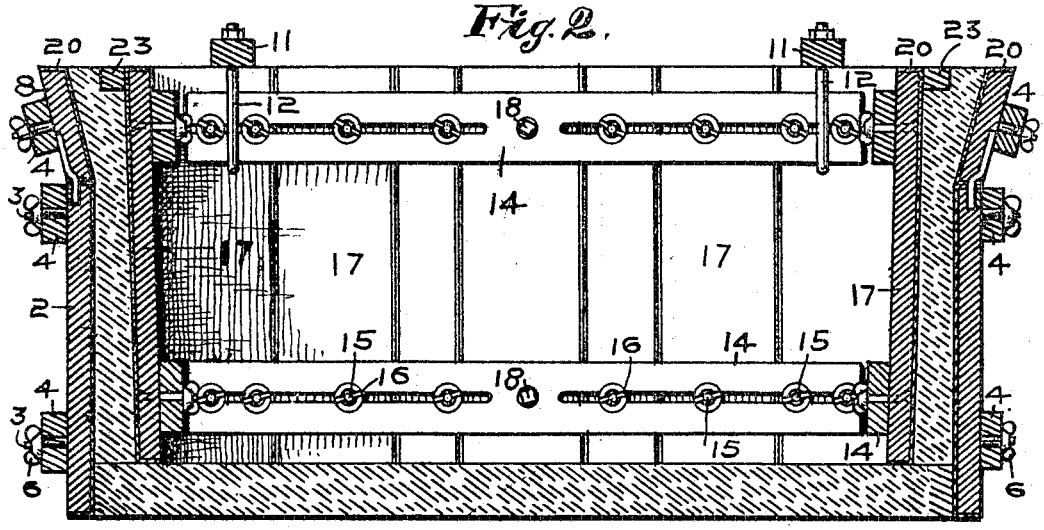

Figure 1 is a top plan view of my complete mold in its operative position; Fig. 2, a vertical section of same on the line 2 2 of Fig. 1; Fig. 3, a vertical cross-section on the line 3 3 of Fig. 1, and Fig. 4 an end elevation of the mold.

Like characters of reference indicate like parts throughout the several views of the drawings.

The outside of the mold is composed of the rigid corner-sections 1 and the intermediate removable sections 2, which latter are of various widths to enable the length and width of the mold to be changed to suit the dimensions of the particular receptacle to be molded. The dividing-lines between the sections run transversely of the mold, and each of the resultant vertical sections 2 has a threaded bolt 3 adjacent to each end. The several sections 2 at each side and end of the mold are joined together and to their respective ends 1 by means of the bars 4, which have longitudinal slots 5, through which the bolts 3 are passed. The several parts are locked together by screwing up the nuts 6 on the threaded bolts 3. The ends 1 and intermediate sections 2 will all preferably be divided on the horizontal plane through the joints 7, whereby oblique upper sections 8, as shown in the drawings, may be placed upon the lower sections in order to widen the concrete product, such as burial-vaults, at the top to make room for a rectangular groove or rabbet to receive the lid. For water-troughs, milk-troughs, and the like where this rabbet is not desired the oblique members of the mold are removed and straight ones conforming with the lower members are substituted. Each of the top members will be provided with a metal dowel-pin 9, which enters a socket 10 in its lower member. The latter is preferably made from a metal strap or plate with a half-round middle bend, from which take flanges that are riveted or bolted to the mold-section. The dowel and its socket are set in so as to be below the outer face of the mold to prevent interference with the bars 4.

The bars 11 11 are laid across the outside mold above described, and from these bars the inside mold is suspended by means of the bolt-hooks 12. The inner mold is considerably smaller than the outer mold, and the space between the two will be filled with concrete to produce the side and end walls of the concrete box. The side and end walls of this inner mold are united at the corners of the latter in a fixed manner; but between said corners the walls are divided transversely to form four right-angle corner-pieces 13, which are movable to and from each other to change the dimensions of the said inner mold. A given adjustment of the several sections is held by the bars 14, which are secured thereto by means of the bolts 15, having the wing-nuts 16. These bars will be provided with longitudinal slots to receive the bolts and allow adjustment of the mold-sections without removing the bolts. The space between the ends of the corner-pieces 13 will be filled with the vertical sections 17, which will be held by similar bolts 15 with nuts 16. The divided parts of the mold at the sides and ends will always be separated by at least one removable section, whereby by its withdrawal after the concrete walls have been formed and have become set the inner mold may be contracted for easy removal. The middle member of the removable sections will be the one that will always be present for all sizes of the mold, and it will have its edges oblique where they join with the adjacent sections. Their slope will be toward each other from rear to front to make an outwardly-tapering wedge formation, and this wedge-shape section will contact with the correspondingly-sloped edges of the adjacent members of the mold by the outward movement of said middle section, thereby tightening up the several parts. This outward movement is obtained by means of the set-screws 18, which are screwed through bars 14 against said middle sections, as shown in Fig. 1. The bars 14 are notched at 19 to make room for the easy insertion and removal of said middle section. It will also be noted by examination of Figs. 2 and 3 that the walls of the inner mold are oblique to facilitate the withdrawal of the mold after the concrete is molded and also to increase the thickness and strength of the walls of the box at the bottom and make the expansion easier in case of freezing of the liquid contents of the box to thereby lessen the danger of breakage due to that cause.

The surfaces of all of the parts of the inner and outer molds will be covered with sheet metal 20 where they will contact with the concrete-work, so as to make a smoother finish on the concrete surfaces than would obtain from contact with mold-surfaces of wood. These metal coverings extend into the joints to cover the edges of the sections, as shown in the drawings.

The operation and preferred use of my improved mold are as follows: The outside mold, adjusted by means of the removable sections to the required size, is placed on a level surface and the wooden strips 21 are laid against the inside of the mold. The height of these strips gage the thickness of the bottom, concrete for which is deposited in the mold between said strips until the tops of the strips are reached. Then the strips are withdrawn, which is easily done with the trowel, whereupon the inner mold, which has been previously adjusted to the desired size, is hoisted by means of rope and tackle and a derrick high enough to clear the top of the outer mold and is then deposited therein in proper position, where it is suspended by means of the hooks 12 from the bars 11. The bars 11 are laid across the outer mold and are supported thereon, and the hooks 12 are caught under the bars 14. When the inner mold is in position, the space all around between the two molds is filled in with the concrete, and by entering the space previously occupied by the strips 21 a good joint is made between the walls and the bottom, and no joint at all is shown in the outer wall, where it would otherwise be sure to be noticeable. Just before the top of the wall is finished out the wooden strips 23 are laid in place against the inner mold to form a rabbet to receive the lid of the box. When the concrete structure has become set and dry enough to stand alone, the inner mold is removed by first loosening and taking out the middle or key sections, which allows the walls to be shortened enough to permit the mold to be drawn out without injuring the concrete. In making shallower troughs or boxes, like watering-troughs, milk-boxes, and the like, the top members 8 of the outer mold will be left off, the bars 11 being supported on blocks laid on the lower mold parts.

Having thus fully described my invention, what I claim as new, and wish to secure by Letters Patent, is—

1. In a mold for forming concrete receptacles, a removable middle portion in a plurality of separable parts, horizontal bars secured to the inner sides of said middle portion and a vertical removable strip introduced in the series of parts connected by each of said bars and supported from said bars, said removable strip having outwardly-sloping edges, and the adjacent parts thereto having correspondingly-obliqued edges.

2. In a mold for forming concrete receptacles, a removable middle portion in a plurality of separable parts, a middle member in each series of removable sections having oblique outwardly-tapering edges, and the adjacent sections thereto having oblique edges of the same slope as the adjacent edge of said middle member.

3. In a mold for forming concrete receptacles, a removable middle portion in a plurality of separable parts, horizontal bars secured to the inner sides of each series of said separable parts, a middle member in each series of removable sections having oblique outwardly-tapering edges, adjacent sections thereto having oblique edges of the same slope as the adjacent edge of said middle member, and means operated from the horizontal bars for moving said middle member in an outward direction.

4. In a mold for forming concrete receptacles, a removable middle portion in a plurality of separable parts, a middle member in each series of removable sections having oblique outwardly-tapering edges, adjacent sections thereto having oblique edges of the same slope as the adjacent edge of said middle member, horizontal bars secured to the inner sides of each series of said separable parts being notched to allow for the easy insertion of said middle member, and set-screws through the bars against the middle members to force the latter in an outward direction.

5. In a mold for forming concrete receptacles, an outside mold in a plurality of transversely-divided parts whereby the dimensions of the mold may be changed, said mold being used on a plane surface, temporary gage-bars laid on said plane surface next to the inner sides of the mold during the formation of the mold-bottom, and an inside mold in a plurality of separable parts, removably secured within said first mold, said inside mold having a middle member in each series of removable sections with oblique outwardly-tapering edges, and adjacent sections having oblique edges of the same slope as the adjacent edge of said middle member.

6. In a mold for forming concrete receptacles, an outside mold in a plurality of transversely-divided parts, a middle member in each series of removable sections having oblique outwardly-tapering edges and the adjacent edges thereto having oblique edges of the same slope as the adjacent edge of said middle members, and a sheet-metal covering for all of the surfaces of both inner and outer molds that contact with the cement, said sheet-metal coverings being continued into the joints so as to cover the edges of said sections.

In witness whereof I have hereunto set my hand and seal, at Indianapolis, Indiana, this 24th day of August, A. D. 1904.

JOHN A. JOHNSON. [L. S.]

Witnesses:
JOSEPH A. MINTURN,
F. W. WOERNER.